United States Patent [19]

Yamamoto et al.

[11] Patent Number: 5,914,797
[45] Date of Patent: Jun. 22, 1999

[54] AUDIO VIDEO APPARATUS CONTROLLER

[75] Inventors: Yasuyuki Yamamoto; Yoshio Osakabe, both of Kanagawa, Japan

[73] Assignee: Sony Corporation, Japan

[21] Appl. No.: 08/340,435

[22] Filed: Nov. 14, 1994

Related U.S. Application Data

[63] Continuation of application No. 07/704,046, May 22, 1991, abandoned.

[30] Foreign Application Priority Data

Jun. 29, 1990 [JP] Japan .................................. 2-171708

[51] Int. Cl.⁶ .................................................. H04B 10/00
[52] U.S. Cl. ........................... 359/146; 359/142; 359/147
[58] Field of Search ..................................... 359/142, 143, 359/145, 146, 148, 147; 340/825.69, 825.72, 309.15

[56] References Cited

U.S. PATENT DOCUMENTS

| | | | |
|---|---|---|---|
| 4,718,112 | 1/1988 | Shinoda .............................. | 358/194.1 |
| 4,745,402 | 5/1988 | Auerbach ............................ | 359/142 |
| 4,817,203 | 3/1989 | Tsurumoto et al. ................. | 359/148 |
| 4,843,384 | 6/1989 | Ide et al. ............................ | 358/194.1 |
| 4,937,672 | 6/1990 | Anderson ............................ | 358/181 |
| 4,959,720 | 9/1990 | Duffield et al. .................... | 358/194.1 |
| 4,989,081 | 1/1991 | Miyagawa et al. ................. | 358/183 |
| 5,109,222 | 4/1992 | Welty ................................. | 359/174 |
| 5,235,414 | 8/1993 | Cohen ................................ | 359/146 |

FOREIGN PATENT DOCUMENTS 0105696  4/1989  Japan .................................... 359/146

*Primary Examiner*—Rafael Bacares
*Attorney, Agent, or Firm*—Rader, Fishman & Grauer; Ronald P. Kananen

[57] ABSTRACT

An audio video apparatus controller connected to a timer provided in a desired audio video apparatus wherein a reserve number indicative of the order of input data and a time are uniquely and correspondingly stored each time the time is input. The audio video apparatus controller is comprised of time input devices for inputting the time to the timer, selecting devices for selecting one of the audio video apparatus, setting devices for setting operation conditions of the selected audio video apparatus in association with the time, and a control circuit responsive to a command signal from the timer to control the selected audio video apparatus so that the selected audio video apparatus is operated at the input time in accordance with the operation conditions. Therefore, the timer can be utilized in the extended range and a plurality of audio video apparatus can be controlled in a well-coordinated fashion.

19 Claims, 4 Drawing Sheets

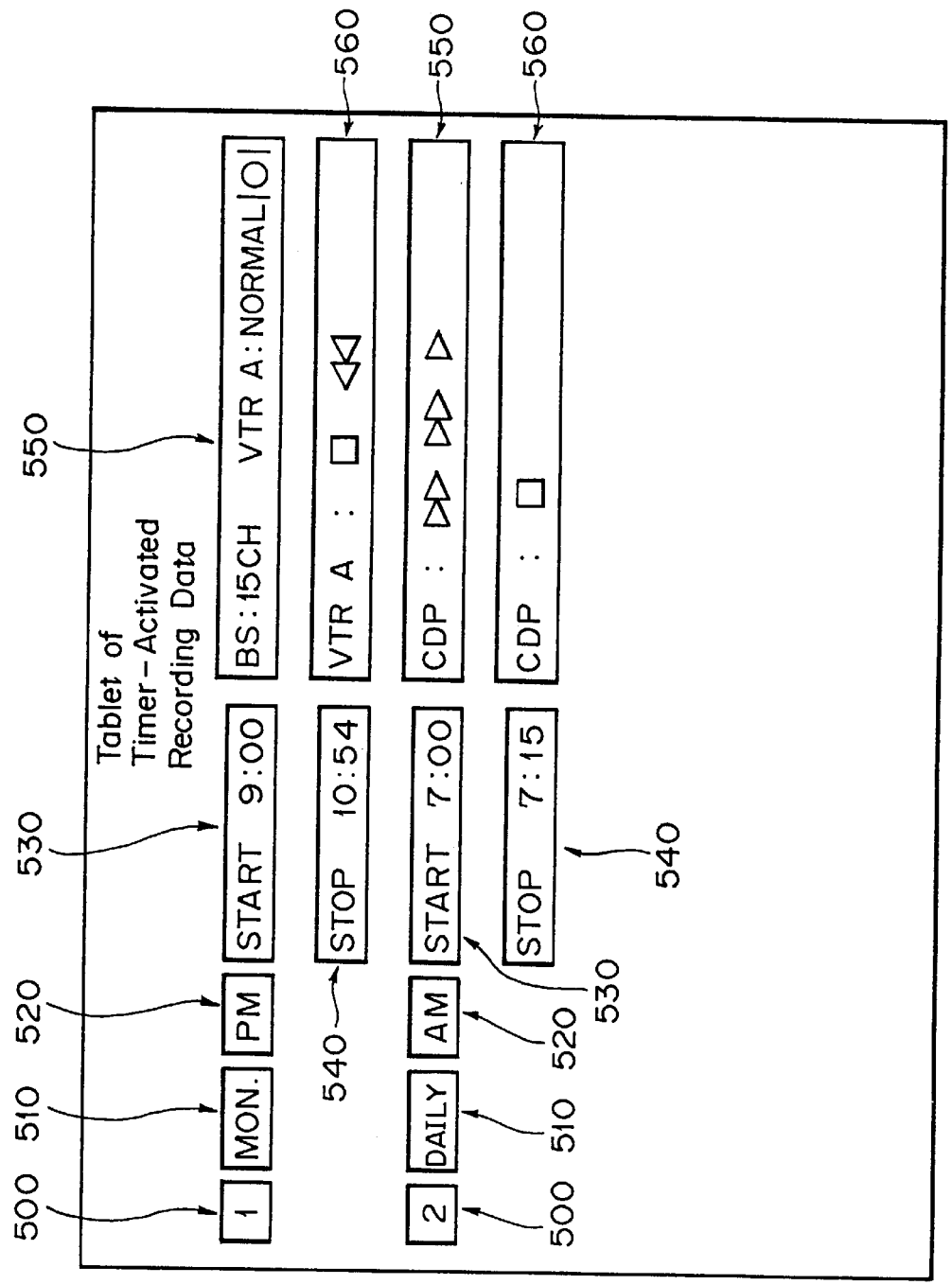

AUDIO VIDEO APPARATUS CONTROLLER

This application is a continuation of application Ser. No. 07/704,046 filed May 22, 1991 now abandoned.

BACKGROUND OF THE INVENTION

1. Field of the Invention

The present invention generally relates to audio video apparatus controllers and, more particularly, is directed to an audio video apparatus controller for use in collectively controlling operations of a plurality of audio video apparatus.

2. Description of the Prior Art

Generally, the use of a timer built-in a VTR (video tape recorder), for example, is limited, such as when automatic recording, i.e., timer-activated recording or the like is made in the VTR.

However, in accordance with the increase of the kinds of audio video apparatus, it is requested to utilize the timer in a wide variety of fields, such as when respective audio video apparatus are controlled in a well-coordinated fashion.

In this case, it is proposed to collectively control respective audio video apparatus by timers provided in the respective apparatus, which unavoidably makes the audio video apparatus expensive. Therefore, it is desirable that the function of the timer built-in the VTR is utilized in a wide variety of purposes.

OBJECTS AND SUMMARY OF THE INVENTION

Accordingly, it is an object of the present invention to provide an improved audio video apparatus controller in which the aforenoted disadvantages of the prior art can be eliminated.

More specifically, it is an object of the present invention to provide an audio video apparatus controller in which a timer can be utilized in a wide variety of purposes.

It is another object of the present invention to provide an audio video apparatus controller in which audio video apparatus can be controlled with ease in a well-coordinated fashion.

As an aspect of the present invention, an audio video apparatus controller is connected to a timer provided in a desired audio video apparatus wherein a reserve number indicative of the order of input data and a time are uniquely and correspondingly stored each time the time is input. The audio video apparatus controller is comprised of time input video apparatus controller devices for inputting the time to the timer, selecting devices for selecting one of the audio video apparatus, setting devices for setting operation conditions of the selected audio video apparatus in association with the time, and a control circuit responsive to a command signal from the timer to control the selected audio video apparatus so that the selected audio video apparatus is operated at the input time in accordance with the operation conditions. Therefore, the timer can be utilized in the extended range and a plurality of audio video apparatus can be controlled in a well-coordinated fashion.

The above, and other objects, features and advantages of the present invention will become apparent in the following detailed description of an illustrative embodiment thereof to be read in conjunction with the accompanying drawings.

BRIEF DESCRIPTION OF THE DRAWINGS

FIG. 3 is a diagram used to explain displayed contents or the like on a television monitor installed on the audio video apparatus controller of the present invention.

DETAILED DESCRIPTION OF THE PREFERRED EMBODIMENT

An embodiment of an audio video apparatus controller according to the present invention will hereinafter be described with reference to the drawings.

Figure 1A:
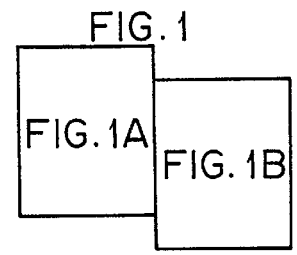
FIG. 1 (formed of FIGS. 1A and 1B) is a schematic block diagram showing an overall arrangement of an embodiment of an audio video apparatus controller according to the present invention.
Figure 1A:
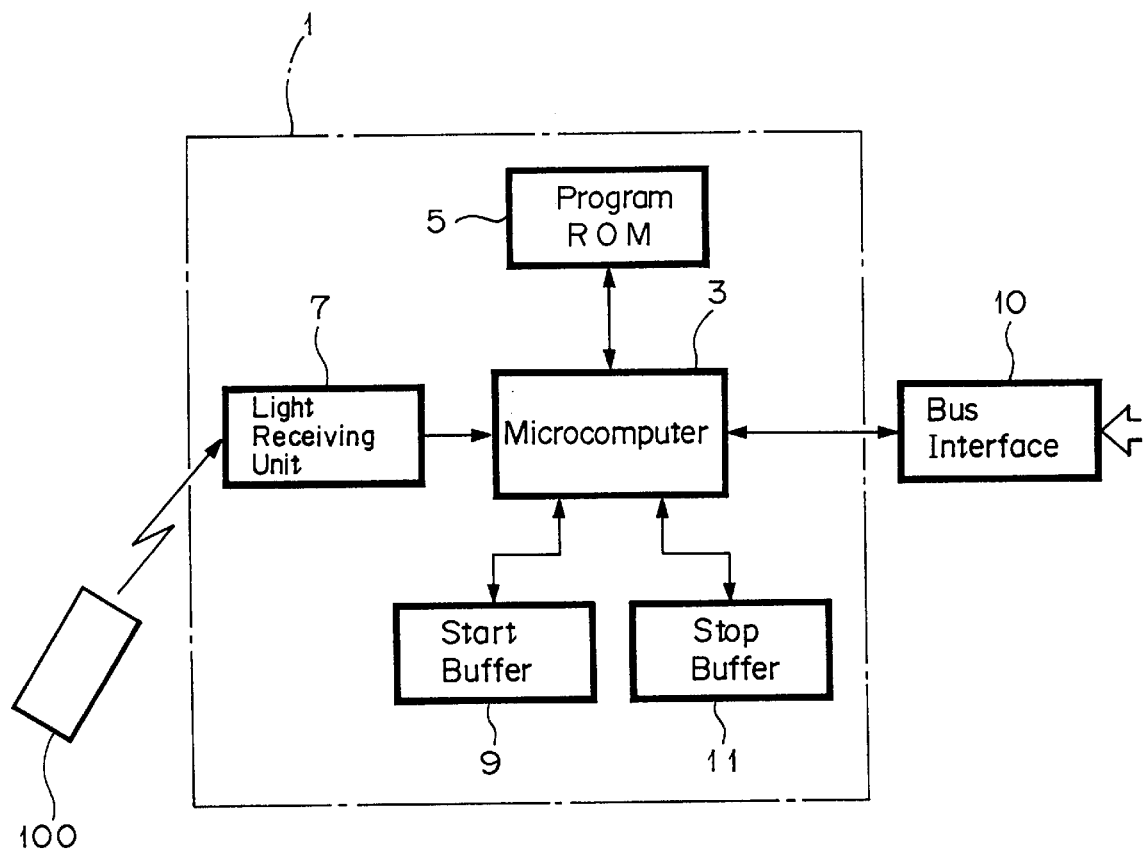
Figure 1B:
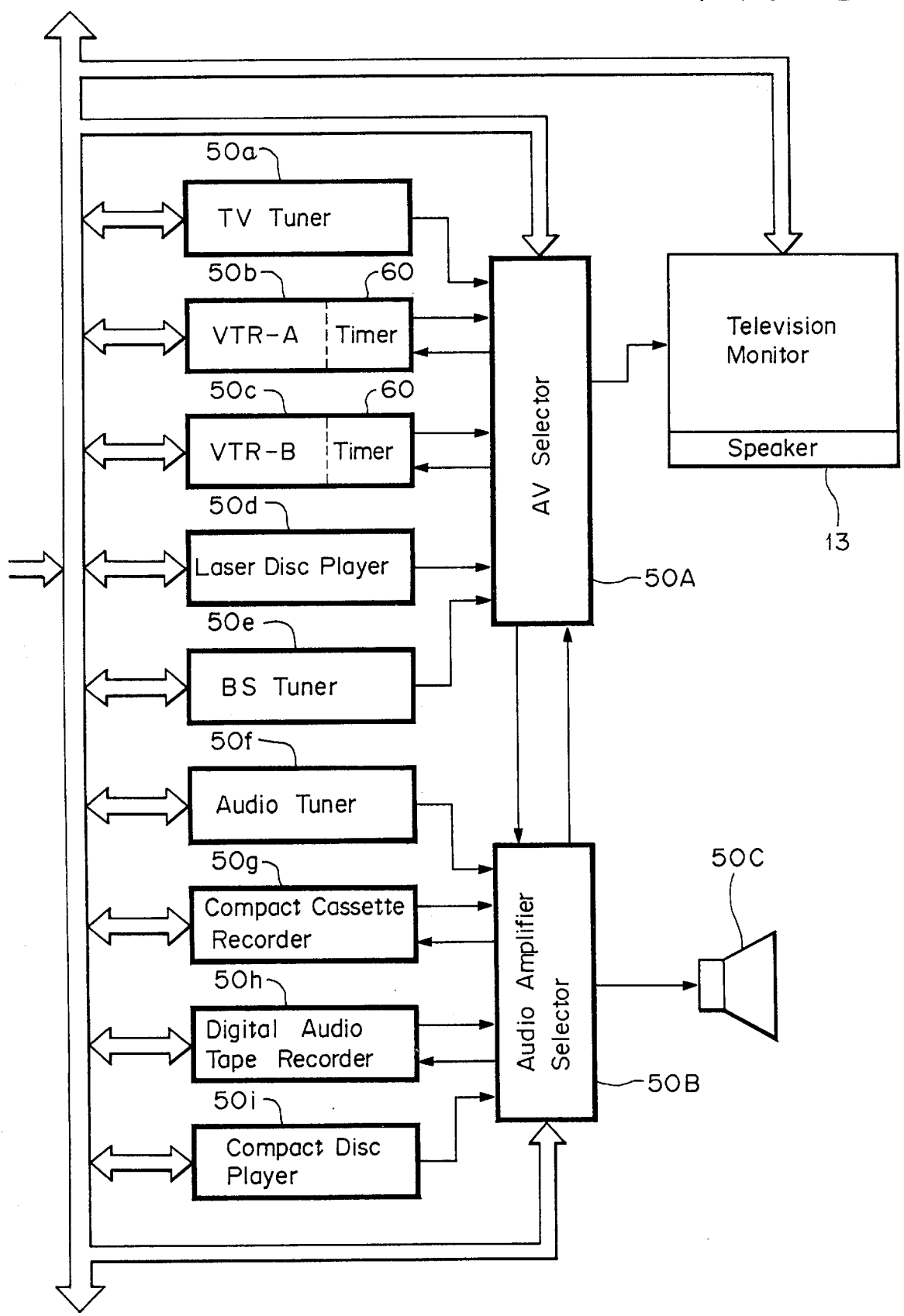

FIG. 1 is a systematic block diagram showing a controller 1 to which the present invention is applied and a variety of audio video apparatus 50 which are controlled in operation by the controller 1. In that case, FIG. 1 is formed of FIGS. 1A and 1B drawn on two sheets of drawings so as to permit the use of a suitably large scale.

The controller 1 is mainly formed of a microcomputer (control means) 3 and controls the operation of the audio video apparatus 50 in accordance with an operation signal input from a remote controller 100 through a light receiving unit 7 and processing data or the like stored in a program ROM (read only memory) 5 by way of a bus interface 10 and a bus line shown by a bold line.

An operation signal necessary for energizing the audio video apparatus 50 is stored in a start buffer 9, an operation signal necessary for stopping the operation of the audio video apparatus 50 is stored in a stop buffer 11, and control contents and so on are displayed on the picture screen of a television monitor 13, if necessary (see FIG. 3).

The audio video apparatus 50 includes an audio video selector 50A for selectively switching and supplying signals delivered, respectively, from a television tuner (TV) 50*a*, a VTR-A 50*b*, a VTR-B 50*c*, a laser disc player (LDP) 50*d*, and a BS (broadcast satellite) tuner 50*e* to the television monitor 13.

The audio video selector 50A interchanges audio signals between it and an audio amplifier selector 50B; and the audio amplifier selector 50B selectively switching and supplying audio signals delivered, respectively, from an audio tuner (AM, FM) 50*f*, a compact cassette recorder (TAPE) 50*g*, a digital audio tape recorder (DAT) 50*h*, and a compact disc player (CDP) 50*i* to a loud speaker 50C.

The audio video selector 50A enables an output signal from the television tuner 50*a*, the laser disc player 50*d* or the BS tuner 50*e* to be supplied to the VTR-A 50*b* and VTR-B 50*c*, while the audio amplifier selector 50B enables an output signal from the audio tuner 50*f* or from the compact disc player 50*i* to be supplied to the compact cassette recorder 50*g* and the DAT 50*h*. Also, the audio amplifier selector 50B enables the dubbing to be effected between the compact cassette recorder 50*g* and the digital audio tape recorder 50*h*.

A situation wherein an audio signal is exchanged between the audio video selector 50A and the audio amplifier selector 50B, is exemplified by the audio signal of the BS tuner 50*e* being recorded by the DAT 50*h* or the like.

Figure 2:
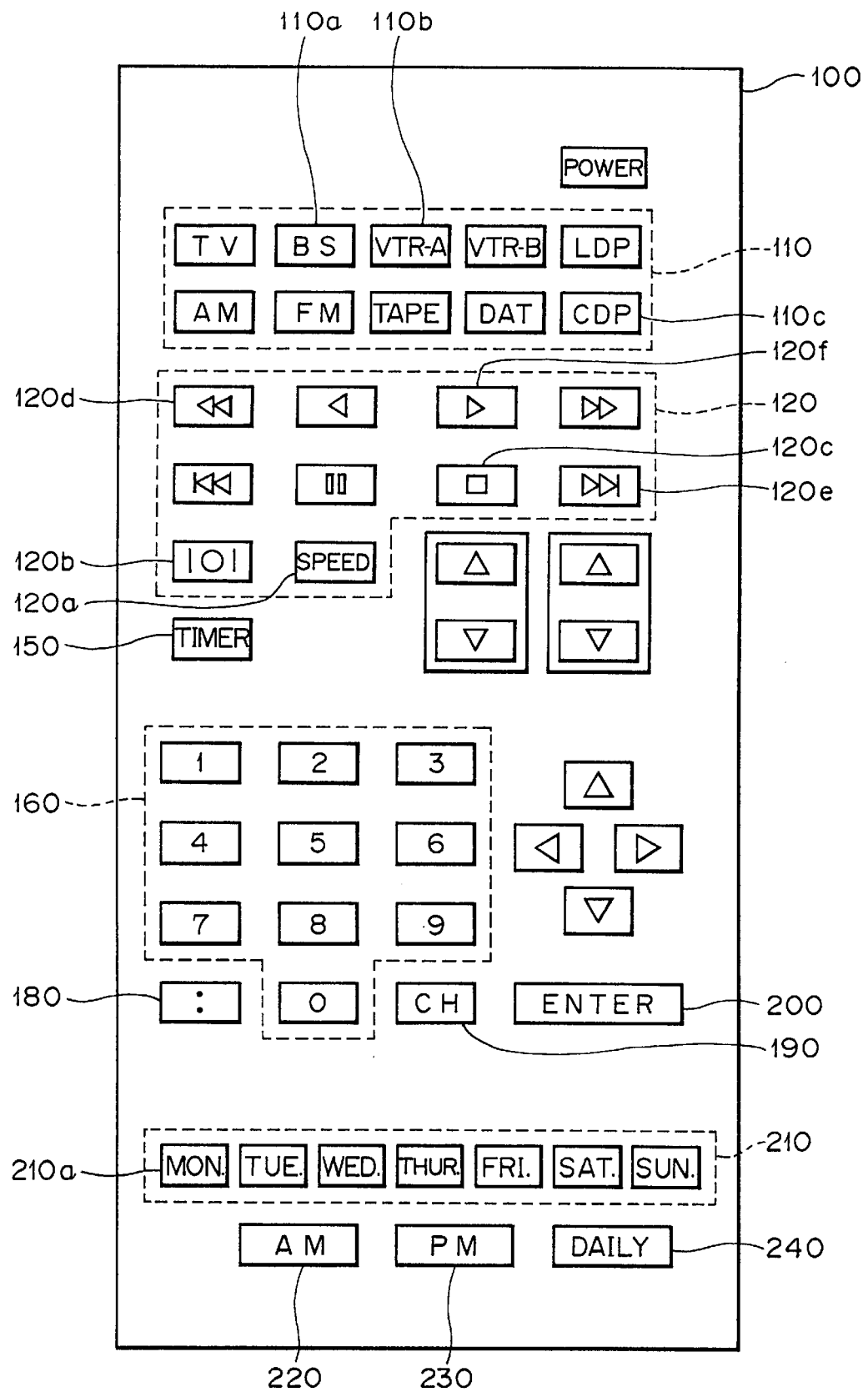
FIG. 2 is a plan view of a remote commander used in the audio video apparatus controller shown in FIG. 1.

As seen in FIG. 2, the remote controller 100 is designed so that information corresponding to a predetermined operation is converted into an infrared signal and received by the light receiving unit 7 so that a variety of control contents (operation signals) implemented by the controller 1 can be inputted thereto from the remote controller 100.

How to input the operation signal by the remote controller 100 to the controller 1 and how the controller 1 is driven in response to the input operation signal will be described next with reference to the following specific examples (1) and (2). (1) To record a television program on channel 15 of the BS tuner 50e by the VTR-A 50b in normal speed during 9:00 p.m. to 10:54 p.m. on Monday. (i) When the viewer pushes a timer button 150 of the remote controller 100, the present situation of the timer in use is displayed on the picture screen of the television monitor 13.

As shown in FIG. 3, the television monitor 13 displays on the picture screen thereof a reserve number display area 500, a day display area 510, an A.M./P.M. separate display area 520, a start time display area 530, a difference of audio video apparatus and an operation condition display area 550 associated with the start time display area 530, an operation end time display area 540 and a difference of audio video apparatus and an operation condition display area 560 associated with the end time display area 540.

In this case, as the timer, a timer 60 incorporated in the VTR-A 50b or in the VTR-B 50c is utilized, and when the timer 60 is supplied with a set of operation start time and operation end time, a memory circuit of the timer 60 stores a reserve number indicating the order of the input set and the times of the set.

When the viewer pushes the timer button 150, the stored reserve number and the times of the set are read out from the memory circuit of the timer 60 by the microcomputer 3 and displayed, respectively, on the display areas 500, 530 and 540. (ii) When the viewer pushes a "Monday" button 210a of a day button pad 210, "Monday" is displayed on the display area 510. Also, when the viewer pushes a PM button 230 to select "P.M.", "PM" is displayed on the display area 520. "Day" data and "A.M" "P.M." data are stored in the memory circuit at the timer 60. (iii) The operation start time is input by pushing keys on a ten-digit key pad 160 and a button 180 in the order of "9", ":", "0" and "0" and the input of the operation start time is completed by pushing an enter key 200 (time input means). The operation end time is input in a similar fashion. (iv) When the viewer pushes a button 110a in an audio video apparatus selecting button key pad 110, the BS tuner 50e is selected, and the operation condition thereof (in this case, the channel selection) is input by pushing the keys in the ten-digit key pad 160 in the order of "1" and "5" and then the input of the operation condition is completed by pushing a button 190 (setting means). (v) The VTR-A 50b is selected by pushing a button 110b and the operation condition thereof (normal speed) is selected by pushing a speed button 120a of a function selecting button pad 120. Whereas, the operation condition thereof (recording) is set by finally pushing the enter button 200 (setting means) after a recording button (including both picture and sound) 120b was pushed, and the thus set data are displayed on the display area 550. (vi) The operation condition and so on in the operation end time are similarly set by pushing a stop button 120c, a rewind button 120d and the enter button 200 in that order after the VTR-A 50b was selected, and the thus set data are displayed on the display area 560.

At operation start time, the BS tuner 50e, the VTR-A 50b, and the audio video selector 50A are powered and the audio video selector 50A is controlled to supply an output signal from the BS tuner 50e to the VTR-A 50b. At operation end time, the power of the respective apparatus must be turned off (the VTR-A 50b is turned off after the rewinding operation) and these essential control procedures are automatically set by the microcomputer 3 when the operation conditions are set.

When the data of the reserve number 1 are set by the remote controller 100 as described above and when the timer time reaches the operation start time, the timer 60 derives a trigger signal (operation start command signal) and this trigger signal is supplied to the microcomputer 3.

Accordingly, the microcomputer 3 energizes the BS tuner 50e, the VTR-A 50b and the audio video selector 50A in accordance with the operation signals stored in the start buffer 9 and the processing data stored in the program ROM 5.

Then, the audio video selector 50A is switched so as to supply the output signal of the BS tuner 50e to the VTR-A 50b and the VTR-A 50b is energized to start the recording at normal speed.

When the timer time reaches the operation end time set, then a trigger signal (operation end command signal) from the timer 60 is supplied to the microcomputer 3 so that the microcomputer 3 turns off the powers of the BS tuner 50e and the audio video selector 50A and also stops and causes the VTR-A 50b to start the tape rewind operation.

At the completion of the tape rewind operation, the power of the VTR-A 50b is turned off and the processing for the reserve number 1 is finished. (2) To reproduce the compact disc from its third music loaded in the compact disc player 50i everyday during a period of 7:00 A.M. to 7:15 A.M. (i) When the listener pushes the timer button 150, data of the reserve number 2 is displayed. Then, when an "everyday" button 240 and the AM button 220 are pushed and when time data are input similarly as described above, respective data are displayed on the display areas 500, 510, 520, 530 and 540 as data of reserve number 2. (ii) Contents of the display area 550 are set and displayed by pushing a button 110c, pushing a music order button 120e twice (when this button 120e is not pushed, then the compact disc is reproduced from its first music), pushing a play button 120f and finally pushing the enter button 200, in that order. (iii) Contents of the display area 560 are set and displayed by pushing the button 110c, the stop button 120c and the enter button 200 in that order.

Contents or data of the reserve number 2 are set as described above. When timer time reaches the operation start time, then the trigger signal (operation start command signal) from the timer 60 is supplied to the microcomputer 3.

The microcomputer 3 energizes the compact disc player 50i and the audio amplifier selector 50B in response to the trigger signal supplied thereto in accordance with the operation signal and the processing procedure data stored respectively stored in the stop buffer 11 and the program ROM 5, and also switches the selector 50B so that the output signal of the compact disc player 50i is supplied to the selector 50B.

Then, the microcomputer 3 controls the compact disc player 50i so that the compact disc player 50i reproduces the third music from the compact disc.

When timer time reaches the operation end time set, the trigger signal (operation ending command signal) from the timer 60 is supplied to the microcomputer 3 so that the microcomputer 3 turns off the powers of the compact disc player 50i and the selector 50B, thereby the processing of the reserve number 2 being ended.

As described above, according to this embodiment, the timer 60 of the VTR-A 50b is utilized to control not only the VTR-A 50b but also other audio video apparatus such as the BS tuner 50e, the compact disc player 50i and so on or the selectors 50A and 50B.

Accordingly, the timer 60 can be utilized in the extended range and the audio video apparatus system 50 can be controlled by the controller 1 in a well-coordinated fashion.

Further, the controller 1 may be preferably incorporated within the audio video selector 50A, and the timer 60 may preferably be provided in the controller 1.

Furthermore, it is also preferable that the operation signal is input to the controller 1 by a panel switch or the like provided in the controller 1 instead of the remote commander 100.

As will be understood from the above description, in the audio video apparatus controller according to the present invention, the audio video apparatus are controlled to operate at desired time by utilizing the timer provided in the audio video apparatus. Accordingly, since audio video apparatus other than the audio video apparatus having the timer can be controlled by the same timer, the timer can be utilized in the extended range and also the audio video apparatus can be controlled in a well-coordinated fashion.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. An audio video apparatus controller comprising:

a central controller;

a plurality of audio video apparatus connected to said central controller through a common bus line;

a timer associated with only one of said audio video apparatus;

a remote controller having a plurality of keys to program said central controller with at least one desired operation, said remote controller providing said central controller with a start time and stop time, with at least one desired apparatus to be controlled, and with said at least one desired operation to be performed by said at least one desired apparatus;

wherein said central controller controls said at least one desired apparatus to perform said at least one desired operation at the start and stop times as determined by said timer; and means, under the control of said central controller, for routing audio and video signals between said plurality of audio video apparatus.

2. An audio video apparatus controller comprising:

a central controller;

a plurality of audio video apparatus connected to said central controller through a common bus line;

a timer associated with said plurality of said audio video apparatus and said controller;

a remote controller having a plurality of keys to program said central controller with at least one desired operation, said remote controller providing said central controller with a start time and stop time, with at least one desired apparatus to be controlled, and with said at least one desired operation to be performed by said at least one desired apparatus;

wherein said central controller controls said at least one desired apparatus to perform said at least one desired operation at the start and stop times as determined by said timer; and wherein said timer is contained within only one of said plurality of audio video apparatus.

3. The audio video apparatus controller as set forth in claim 1, wherein said remote controller transmits infrared signals to said central controller.

4. The audio video apparatus controller as set forth in claim 1, wherein said plurality of keys on said remote controller is comprised of a first set of keys for identifying the day or days of the week, a second set of keys for identifying said start time and said stop time, a third set of keys for identifying each of said plurality of audio video apparatus, and a fourth set of keys for identifying the desired operations.

5. The audio video apparatus controller as set forth in claim 1, further comprising means, connected to said central controller, for indicating the program while said remote controller programs said central controller.

6. The audio video apparatus controller as set forth in claim 1, further comprising means connected to said plurality of audio video apparatus for outputting the audio and video signals produced during said desired operation.

7. The audio apparatus controller as set forth in claim 1, wherein said at least one desired apparatus performing said at least one desired operation comprises said only one of said plurality of audio video apparatus which contains said timer.

8. The audio video apparatus as set forth in claim 2, wherein said at least one desired apparatus performing said at least one desired operation comprises said only one of said plurality of audio video apparatus which contains said timer.

9. A system for controlling a plurality of audio apparatuses connected to a central controller through a common bus line, comprising:

said central controller;

means for programming said central controller to generate a start signal at a start time and to generate a stop signal at a stop time, said start signal being sent over said common bus to a selected audio apparatus for initiating an operation and said stop signal being sent over said common bus for terminating said operation in said selected audio apparatus; and a video tape recorder, included within said plurality of audio apparatuses, having a timer and being connected to said central controller through said common bus line;

said central controller receiving said start time and said stop time from said timer in said video tape recorder and controlling said selected audio apparatus to perform said operation at said start time and said stop time;

wherein a timing of said operation in said selected audio apparatus is controlled according to said timer in said video tape recorder.

10. The system as set forth in claim 9, wherein said selected audio apparatus comprises said video tape recorder.

11. The system as set forth in claim 9, wherein said central controller receives a plurality of start times and a plurality of stop times from said timer for controlling a plurality of said audio apparatuses.

12. The system as set forth in claim 9, wherein said central controller comprises:

a microcomputer;

a start buffer for storing said start signal;

a stop buffer for storing said stop signal;

a ROM for storing a program for said microcomputer; and means in communication with said programming means.

13. The system as set forth in claim 12, wherein said communication means comprises a light receiving unit for receiving optically modulated signals from said programming means.

14. The system as set forth in claim 9, wherein said plurality of audio apparatuses comprises a first set of audio apparatuses connected to an audio selector and a second set of audio video apparatuses connected to an audio video selector.

15. The system as set forth in claim 9, wherein said programming means comprises a remote control unit having a plurality of keys, including a first set of keys for indicating said start time and said stop time, a second set of keys for indicating said selected audio apparatus, and a third set of keys for indicating said operation.

16. The audio video apparatus controller as set forth in claim 1, wherein said routing means routes audio video signals from a selected audio video apparatus to a television monitor.

17. The audio video apparatus controller as set forth in claim 2, further comprising an audio selector, controlled by said central controller, for routing audio signals from one of said audio video apparatuses to at least one speaker.

18. The audio video apparatus controller as set forth in claim 2, further comprising an audio video selector, controlled by said central controller, for routing audio and video signals from one of said audio video apparatuses to a television monitor.

19. The system as set forth in claim 14, wherein said central controller controls said audio selector to route a selected one of said audio signals to at least one speaker and said central controller controls said audio video selector to route a selected one of said audio video signals to a television monitor.

* * * * *